Dec. 9, 1952    W. A. HELBIG    2,620,926
METHOD FOR TREATING LIQUIDS WITH ACTIVATED CARBON
Filed Dec. 22, 1949

WALTER A. HELBIG,
INVENTOR.

Patented Dec. 9, 1952

2,620,926

UNITED STATES PATENT OFFICE 2,620,926

METHOD FOR TREATING LIQUIDS WITH ACTIVATED CARBON

Walter A. Helbig, Yonkers, N. Y., assignor, by mesne assignments, to Atlas Powder Company, Wilmington, Del., a corporation of Delaware Application December 22, 1949, Serial No. 134,523

3 Claims. (Cl. 210—42.5)

The present invention relates to a method for treating liquids with activated carbon.

Activated carbon is one of the most efficient agents known for removing certain materials from liquids. By reason of this property, it has found widespread use as a purifying agent to remove organoleptic or other unwanted materials from process solutions, sugar solutions, vegetable oils, potable waters, electroplating baths, etc. The same property is usefully employed to remove valuable substances from dilute solutions, particularly for the recovery of antibiotic substances from solutions in which they are prepared. In the use of activated carbon as a purifying agent, the purified liquid is the valuable product. Where the activated carbon is the extracting agent for the valuable substance, the carbon containing the extract is the valuable product and is subsequently treated to desorb the extracted material.

Activated carbon, by comparison with other adsorbents, is an exceptionally efficient extracting agent. However, in treating a liquid with a very small amount of activated carbon, the full efficiency of the carbon is rarely utilized because of the difficulty of mixing and achieving proper contact with the carbon. On the other hand, in applications where substantial quantities of powdered carbon are used, the mixing problem is not serious but the problem of separating the carbon from the liquid is a serious one. The conventional method for separating carbon and liquid is by filtration which is, in practically all cases, an intermittent process in that when a filter becomes filled with the carbon it must be cut out of service for cleaning. Time so lost and labor charges for taking down, cleaning and reassembling the filter constitute an appreciable part of the cost of using activated carbon.

It is an object of the present invention to provide an improved method for treating liquids with activated carbon whereby the full efficiency of the carbon is approached more nearly than was possible with former methods.

Another object of the invention is to avoid the necessity of filtering the solution to remove the carbon in most cases, and in other cases to reduce the amount of carbon that has to be removed by filtration to a small percentage of the dosage.

A further object is to provide a continuous method for treating liquids with activated carbon.

A still further object is to provide a continuous highly efficient method for eluting activated carbon to desorb materials therefrom.

The above and other objects will become apparent in the course of the following description.

In accordance with the invention, it has been found possible to treat liquids with any desired small amount of powdered carbon, to use the carbon to an extent approaching the exhaustion of its adsorptive power, and to remove all or substantially all of the carbon from the treated liquid by gravity settling resulting in a substantially carbon-free effluent. This has been made possible by the discovery that under suitable conditions of treatment the powdered carbon particles can be caused to agglomerate and form a relatively dense suspension through which the liquid being treated can pass leaving in the suspension the carbon added for treatment and the materials extracted by the carbon.

The essential features of the method consist in preparing a relatively concentrated slurry of powdered activated carbon in a liquid compatible with the process liquid (usually the same as the process liquid), mixing the slurry and permitting the carbon particles to agglomerate, establishing the agglomerated carbon slurry in a separating zone, permitting the carbon agglomerates to settle by gravity in the separating zone forming a concentrated suspension and leaving a supernatant layer of liquid, continuously passing liquid to be treated up through the carbon agglomerate suspension in the separating zone at a rate to keep the agglomerates hydraulically suspended without producing mixing with the supernatant layer, and continuously drawing off treated liquid from the top of the separating zone.

For prolonged continuous operation further quantities of the activated carbon must be added to replace exhausted carbon, and exhausted carbon must be removed. The addition and removal of carbon can be either continuous or intermittent. When additional carbon is added during operation, it is preferred to add it as a slurry and to mix and agglomerate it in the incoming process liquid before passing them into the separating zone. The exhausted carbon removed from the separating zone can be dewatered and washed (sweetened off) if the entrained liquid is worth recovering.

The foregoing method can be practiced in various types of apparatus but for illustration, the invention will be described in conjunction with the apparatus illustrated in the drawings.

In the drawings wherein like numbers refer to like or corresponding parts,

Figure 1:
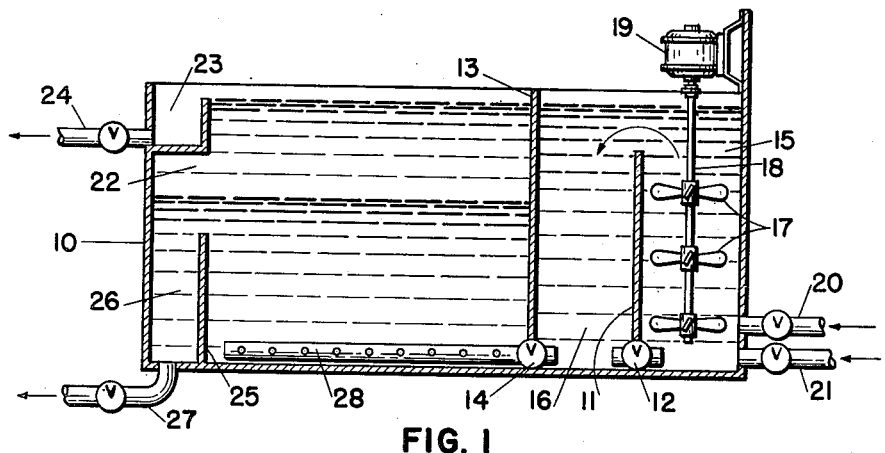
Figure 1 is a diagrammatic illustration in the form of a vertical section through a treating apparatus containing a liquid to be treated and activated carbon and illustrating the steady state of the continuous method of the invention.

Referring now to the drawings and particularly to Figure 1 thereof, an apparatus suitable for practicing the method of the invention comprises a tank 10 of metal or other suitable material of construction to contain the liquid to be processed. A vertical partition 11 extends transversely across the tank 10 near one end thereof. Partition 11 runs from the bottom of the tank 10 to a position substantially below the plane of the top of the tank. The lower edge of the partition 11 is provided with one or more valves 12 which are controllable to place the opposite sides of the partition in communication or to isolate the opposite sides. A second vertical partition 13 likewise extends transversely across the tank 10 but this partition runs from the bottom of the tank to a position substantially in the plane of the top of the tank so that the partition 13 divides the tank into a large and a small chamber. The lower edge of the partition 13 is provided with one or more valves 14 which are selectively operable to connect or isolate the chambers of the tank 10. The partition 11 subdivides the smaller chamber of the tank 10 into two zones, which may be designated as a mixing zone 15 and an agglomerating zone 16.

The mixing zone 15 is provided with an appropriate mechanical mixing device which is illustrated in the form of a series of propellers 17 mounted on a shaft 18 which is driven by a motor 19. The propellers 17 have a pitch such that, when rotated, liquid in the mixing chamber will be caused to move upward. The speed of operation of the mixer must be such as to provide gentle agitation only and not sufficiently fast to cause disruption of the carbon agglomerates.

The end wall of the tank 10 which forms one wall of the mixing zone 15 is provided with a valved carbon inlet 20 and a valved process liquid inlet 21 through which the carbon and liquid to be treated can be introduced respectively into the tank 10.

The larger zone of the tank 10 defined by the partition 13 may be designated as the separating zone 22. This zone is of substantially larger cross section than the combined zones 15 and 16. At the upper portion of the separating zone 22 there is located a launder 23 provided with a valved liquid outlet 24. In the lower portion of the separating zone 22 a baffle 25 defines a chamber 26 which is drained by the valved slurry outlet 27. A liquid distributor 28 is located near the bottom of the separating zone 22 and is connected to the valve 14 so that liquid passing through the valve is distributed over a substantial area of the zone 22.

In the operation of the method using the apparatus of Figure 1, the following steps are practiced: With the valve 14 closed and the valve 12 open, a slurry of powdered activated carbon in a liquid, which may be the process liquid or another liquid compatible with it, is introduced through the carbon inlet 20. As the level of the slurry rises in the mixing zone 15, the mixer motor 19 is started at slow speed to provide gentle agitation and circulation in the connected zones 15 and 16. The introduction of the carbon slurry is continued until the level thereof rises above the top of the partition 11 at which time slurry is circulated over the top of the partition 11 down through agglomerating zone 16 through the valves 12 and back into the mixing zone 15. The circulation of slurry is continued until by observation it is determined that the carbon has agglomerated into particles of appreciable size. At this time the valve 14 is opened to permit the agglomerated slurry to flow into the separating zone 22. Process liquid will have to be introduced through the inlet 21 during the filling of the separating zone 22 in order to provide a sufficient body of liquid to fill the last-named zone. It may be desirable also to introduce further quantities of carbon slurry through the inlet 20 such slurry to be subjected to circulation and agglomeration in the zones 15 and 16 during a part of the time required to fill the separating zone 22.

As the separating zone 22 is gradually filled with slurry containing agglomerated carbon, some separation of liquid from the carbon slurry will be noted. The filling should be accomplished gradually so that by the time the separating zone 22 is filled to the level of the launder 23, a definite clear supernatant layer of liquid is present. The first quantities of liquid flowing into the launder 23 may carry an excessive quantity of fine carbon particles and this liquid may be either recirculated to the feed or discarded as desired.

The next phase is the continuous operation of the method. Having established a body of carbon slurry and a supernatant clear liquid in the separating zone 22, the valve 12 is closed and the liquid to be treated is introduced through the inlet 21 into the mixing chamber. If it is desired to add further quantities of carbon continuously, this may be done through the inlet 20 although the proportion of carbon to liquid to be treated should now be reduced to the normal dosage required for the carbon treatment. In practical operation this will mean reducing the flow of carbon to a ratio which may range from a few percent down to a few parts per million based upon the liquid to be treated, the actual dosage being dependent upon the nature of the system. By control of the rates of flow of liquid and carbon, the liquid is thoroughly mixed with carbon in the chamber 15 and in the agglomerating zone 16 and then allowed to enter the bottom of the separating zone 22 through the distributor 28 where it passes into the slurry of agglomerated carbon. The rate of flow into the separating zone must be adjusted to keep the carbon agglomerates in a state of hydraulic suspension as the liquid passes up through the zone 22 and into the launder 23. This rate must also be controlled to a low enough value that the carbon agglomerates are not carried up into the supernatant layer.

Carbon is removed from the separating zone 22 through the chamber 26 and outlet 27 to keep the system in a state of balance. Carbon withdrawal can be made either continuously at approximately the rate at which carbon is introduced into the system, or it can be made intermittently as desired.

Figure 2:
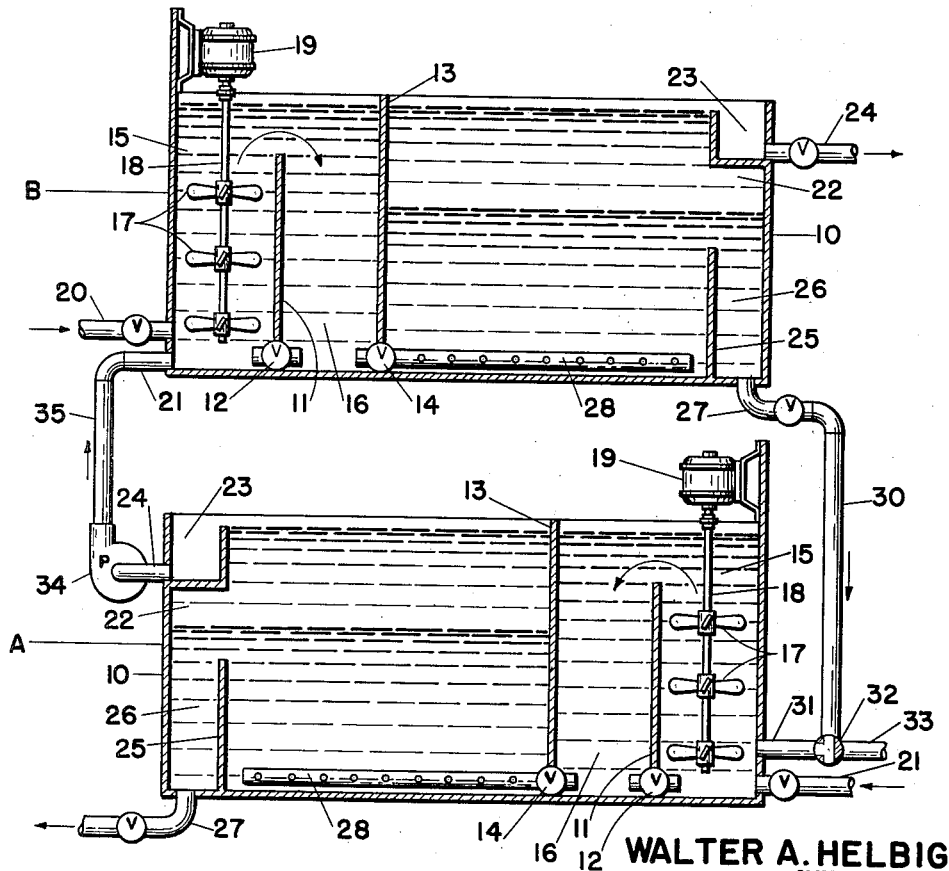
Figure 2 is a diagrammatic illustration similar to that shown in Figure 1 illustrating the continuous countercurrent method of treatment according to the invention.

In Figure 2, two sets of apparatus corresponding to that shown in Figure 1 are connected together to provide for countercurrent use of the activated carbon. Each of the tanks and interior parts thereof of the apparatus in Figure 2 correspond exactly to the single tank illustrated in Figure 1, and the parts are designated by the same reference numerals. For convenience in reference, the first treating apparatus is designated generally as A, while the second treating apparatus is designated generally as B. For countercurrent operation, once-used-carbon slurry withdrawn from apparatus B through its carbon outlet 27 is conducted through connecting pipe 30 to the carbon inlet 31 of apparatus A. The carbon inlet 31 of apparatus A is provided with a three-way valve 32 and a connection 33 through which carbon slurry can be introduced directly. Once-treated-liquid withdrawn from apparatus A through the launder 23 is introduced into the liquid inlet 21 of apparatus B by means of pump 34 and connecting pipe 35.

In countercurrent operation apparatus A is filled with carbon slurry and process liquid through connection 33 and inlet 21 respectively. Mixing and agglomeration are performed and the carbon agglomerate slurry and supernatant layer are established in the separating zone 22 in the same manner as described above with respect to Figure 1.

Apparatus B is then placed in operation by introducing carbon slurry through carbon inlet 20 and process liquid from apparatus A through the inlet 21 of apparatus B, and mixing, agglomerating and filling its separating zone 22 in the manner heretofore described. After both apparatus A and apparatus B have reached operating condition, the method is run continuously with untreated liquid entering apparatus A where it is treated with once-used carbon from apparatus B, and once-treated liquid from apparatus A is introduced into apparatus B where it is treated with fresh carbon.

The method of the invention depends for its operation on the formation of relatively dense carbon agglomerates. The formation of agglomerates is believed to be due to the nature of the surface active forces between the liquid being treated and the carbon. Whether or not a particular carbon-liquid system can be used according to this method may readily be determined by simple test. A quantity of the liquid to be used is placed in a small glass vessel and a quantity of the powdered activated carbon equal to 1 or 2% of the liquid is added and stirred into the liquid. The mixture is then allowed to stand for about 30 minutes. If an agglomeration occurs, it becomes evident shortly after stirring has stopped as indicated by fairly rapid settling of the carbon leaving a relatively clear supernatant layer of liquid. After the mixture has been allowed to stand, a gentle stirring of a small portion of the carbon into the supernatant liquid will reveal the presence of readily visible carbon agglomerates in the supernatant liquid.

On the other hand, if the liquid tends to peptize the carbon and prevent the formation of agglomerates, the suspension prepared as described above will be substantially opaque at the end of 30 minutes and no clear supernatant layer will be present.

In some types of liquids, agglomeration of activated carbon occurs more rapidly than in others. There are also observable differences in particle sizes of agglomerates from one system to another.

Liquids which permit the agglomeration of powered high density activated carbons are, for example, water, many sugar solutions, alcohol, vinegar, and solutions of many chemical products. Examples of liquids which peptize the carbon and prevent agglomerate formation are solutions of strongly surface active substances such as aqueous soap solutions, and solutions which contain strongly surface active colloidal substances such as pectin solutions.

Because the success of the method of this invention depends upon the formation of carbon agglomerates of greater density than the liquid being treated, the carbons to be used must have a wet density greater than the liquid and the higher the density the better. One satisfactory carbon for this purpose is a commercial product made from lignite and having a density of 1.98, referring to water as unity, when the internal pore structure of the carbon is filled with water. The carbon to be used must be of fine particle size. In this specification and in the claims such carbons are referred to as "powdered." In the activated carbon art, suitable finely divided products are offered commercially with the particles of such fineness that 70 to 95% of them will pass a screen having 325 openings per linear inch. This particle size is not sharply critical, but is intended to be illustrative.

The success of the method and the rate at which liquid can be processed depend also on the viscosity and the density of the liquid being treated. Both viscosity and density of the liquid determine the rate of fall of the carbon agglomerates in the separating zone. Therefore the viscosity and density should both be kept at values which will permit ready separation of the carbon slurry from the liquid. In many cases, viscosity can be adjusted by changing the temperature of the operation without resorting to dilution which is generally undesirable. Appreciable reduction of density, on the other hand, will usually require the addition of a diluent or solvent.

As pointed out earlier, one of the difficulties in using activated carbon in commercial processes resides in the fact that the customary treating processes do not permit the use of the full adsorbent power of the carbon. For example, it is a very difficult matter to obtain adequate contact between a liquid and a very small quantity of solid. An outstanding example of this is in the treatment of drinking water supplies where the level of carbon needed to remove taste and odor bodies is of the order of a few parts per million. It would take a long mixing period to obtain complete treatment of water at this level. In this and in other cases where activated carbon is used by conventional methods, it has been found necessary to use excessive quantities of carbon in order to obtain the effect at a practical rate or with practical mixing operations.

The present invention provides in the separating zone of the treatment a very high concentration of carbon and keeps this carbon in the process until it is substantially exhausted. By this method large quantities of liquid can be dosed with small quantities of carbon with the realization of the full effectiveness of the carbon and at an economically feasible rate.

The quantity of carbon to be used for a given treatment can be determined in the usual manner by small scale batch tests, but it will frequently be found possible to use substantially smaller dosages than indicated in this way after the process has reached its continuous stage. This lower limit of dosage can readily be determined by sampling the effluent liquid and changing the rates of carbon and/or liquid feed.

The carbon removed from the apparatus is in the form of a relatively heavy sludge. Where the liquid being treated is valuable, the sludge can be dewatered and washed to remove the liquid values. Only a small quantity of material requires filtering and washing in this manner and simple handling methods are sufficient since the filtrate washings will ordinarily be returned to the liquid feed of the system. The dewatered and washed carbon can be revivified if desired in known manner.

The foregoing description has referred to the invention in terms of the use of carbon to adsorb substances from the liquid being processed. The invention is also applicable, however, to the elution of adsorbed substances from activated carbon. In either case, the advantage of exhausting the carbon and avoiding or minimizing filtration are of substantial value. The elution application of the invention will be found particularly useful in connection with the processing of antibiotics. Materials such as streptomycin are grown in a culture medium where they are present at considerable dilution. Activated carbon has been found to be an effective adsorbing agent for taking the streptomycin from this dilute culture medium. The carbon carrying the streptomycin is then subjected to the action of an eluting agent to yield a solution of streptomycin free from the unadsorbed ingredients of the nutrient medium. For the application of this invention to elution, a slurry of the carbon carrying the valuable material is made up and fed into the apparatus where it is mixed and agglomerated and passed into the separating zone as before described. After separation has occurred further quantities of eluting solvent are introduced continuously and the solution of streptomycin or other material is withdrawn through the launder at the top of the separating zone. Further quantities of the charged carbon can be introduced either continuously or intermittently into the apparatus. Extracted carbon is removed, dewatered and washed to remove last portions of the streptomycin.

The clarified liquid removed from the apparatus from the launder contains little or no activated carbon. In some cases it will be found desirable to filter this liquid to remove such traces of carbon that may be entrained. However, it will be apparent that filtration to remove such small traces of carbon is a simple and inexpensive operation by comparison with the former methods of batch treatment where all of the activated carbon had to be removed by filtration. Due to the small quantity of carbon involved, the filter cloths or other filter elements can be used for long periods without cleaning.

*Example 1*

A slurry is first prepared consisting of two parts by weight of powdered high density activated lignite carbon (Darco-S51 manufactured by Darco Corporation) in 100 parts by weight of water. This slurry is then introduced into apparatus of the type illustrated in Figure 1 and circulated through the mixing and agglomerating zones until agglomeration occurs after which the agglomerated slurry is introduced into the separating zone. As the separating zone fills the agglomerates of carbon settle forming a lower relatively dense carbon slurry and leaving a clear supernatant layer of water.

Water to be treated is then introduced continuously into the apparatus and allowed to enter the bottom of the separating zone at a rate sufficient to keep the carbon agglomerates hydraulically suspended without causing them to mix with the supernatant layer. Treated water is withdrawn continuously through the launder. Further quantities of carbon are added intermittently in slurry form to provide an average amount of carbon to feed water in the range of 2 to 10 parts per million parts of water. When additional carbon is fed in this manner, feed water and carbon are passed through the mixing and agglomerating zones to initiate agglomeration before introduction into the separating zone.

It is to be noted that in this example the carbon is introduced intermittently rather than continuously during operation. The reason for this is found in the level of dosage employed for water treatment. In order for agglomeration of the carbon to occur, a number of the smaller particles have to come together. At very low concentrations, such as a few parts per million, agglomeration is uncertain. To overcome this, the carbon is added in larger doses from time to time, agglomeration being readily obtained at the higher concentrations thus produced temporarily in the mixing and agglomerating zones.

*Example 2*

A slurry of the same powdered activated lignite carbon is first prepared containing 1.25 pounds of carbon per gallon of water. (Sugar solution to be treated may be substituted for the water in making up the slurry if desired.) This slurry is charged into the mixing zone of the apparatus of Figure 1, and a sugar solution of 18° Brix is added at the same time in proportions such that a total of two pounds carbon enter the apparatus for each 100 pounds of the sugar solution. During this time, the valve 14 remains closed and the valve 12 is open, the mixer is operated and the slurry is thus circulated around in the mixing and agglomerating zones until carbon agglomeration occurs. The valve 14 is then opened and valve 12 is closed while continuing the mixing, thereby slowly filling the separating zone. The agglomerated carbon in separating zone 22 settles into a lower layer leaving a clear supernatant layer.

At this stage, the addition of the sugar solution is continued but the amount of carbon slurry continuously fed is cut back so that in the mixing zone the proportions become 1 pound of carbon per 100 pounds of sugar solids. The rates of flow through the apparatus are regulated to keep the carbon agglomerates in hydraulic suspension in the separating zone as before described.

Decolorized sugar solution is withdrawn continuously through the launder 23. Spent carbon slurry is withdrawn continuously through the outlet 27 and thereafter dewatered and sweetened off in the usual manner.

*Example 3*

Powdered activated high density lignite carbon charged with streptomycin adsorbed from a nutrient broth is treated as follows to recover the streptomycin:

The charged carbon is made into a slurry with an eluting solvent consisting of a 50% solution of methanol in water adjusted with hydrochloric acid to pH 2.0. The slurry contains approximately 1.25 pounds of the carbon (dry basis) per gallon of solvent. This slurry is fed into the mixing zone of the apparatus of Figure 1 along with a further quantity of the solvent in the proportion of 4 gallons of solvent per gallon of carbon slurry. This diluted slurry is mixed and circulated through the agglomerating zone of the apparatus until the carbon agglomerates. At this time the separating zone is filled with the agglomerated slurry, additional carbon slurry and solvent being introduced continuously into the mixing zone at a rate to fill the separating zone slowly and permit separation of the hydraulically suspended carbon agglomerates and clear liquid. Fresh charged carbon slurry and fresh eluting solvent are continuously introduced into the mixing zone, mixed, circulated, agglomerated, and passed into the separating zone. Clear eluting solvent containing streptomycin desorbed from the carbon is continuously withdrawn through the launder 23. Exhausted carbon is continuously or intermittently withdrawn through the outlet 27 and is subsequently dewatered and washed to recover last portions of the valuable antibiotic.

It will be apparent that many changes may be made in the details of the method herein described without departing from the scope of the invention which is pointed out in the following claims.

What is claimed is:

1. The method of treating water with activated carbon which comprises mixing together a powdered high density activated lignite carbon and water to form a relatively concentrated slurry of the carbon in water, gently agitating and circulating the slurry until the carbon has agglomerated into particles of appreciable size, introducing the agglomerated slurry and water to be treated into a separating zone, permitting the agglomerates to settle by gravity in the separating zone forming a supernatant relatively carbon-free water layer and a lower layer of denser carbon agglomerates suspended in water, continuously introducing water to be treated into said lower layer in the separating zone at a rate to keep the carbon agglomerates in hydraulic suspension without substantially carrying them into the supernatant layer, continuously removing water from said supernatant layer, intermittently adding fresh agglomerated relatively concentrated slurry of powdered high density activated lignite carbon in water to said lower layer of denser carbon agglomerates in the separating zone, the rate of intermittent carbon addition being correlated with the rate of introduction of water to be treated to provide an overall dosage of about 2 to 10 parts of carbon per million parts of water, and removing spent carbon from said lower layer in the separating zone.

2. The method of claim 1 wherein the said powdered high density activated lignite carbon has a particle size such that 70 to 95% of the particles will pass a screen having 325 openings per linear inch.

3. The method of claim 1 wherein said relatively concentrated slurry of carbon in water contains about 2 parts by weight of the carbon to 100 parts of water.

WALTER A. HELBIG.

REFERENCES CITED

The following references are of record in the file of this patent:

UNITED STATES PATENTS

| Number | Name | Date |
|---|---|---|
| 2,120,227 | Brant | June 14, 1938 |
| 2,255,875 | Buxton et al. | Sept. 16, 1941 |
| 2,294,697 | Seip | Sept. 1, 1942 |
| 2,317,026 | Brown et al. | Apr. 20, 1943 |
| 2,440,680 | Gerin | May 4, 1948 |
| 2,472,976 | Hoover | June 14, 1949 |